Figure 1:
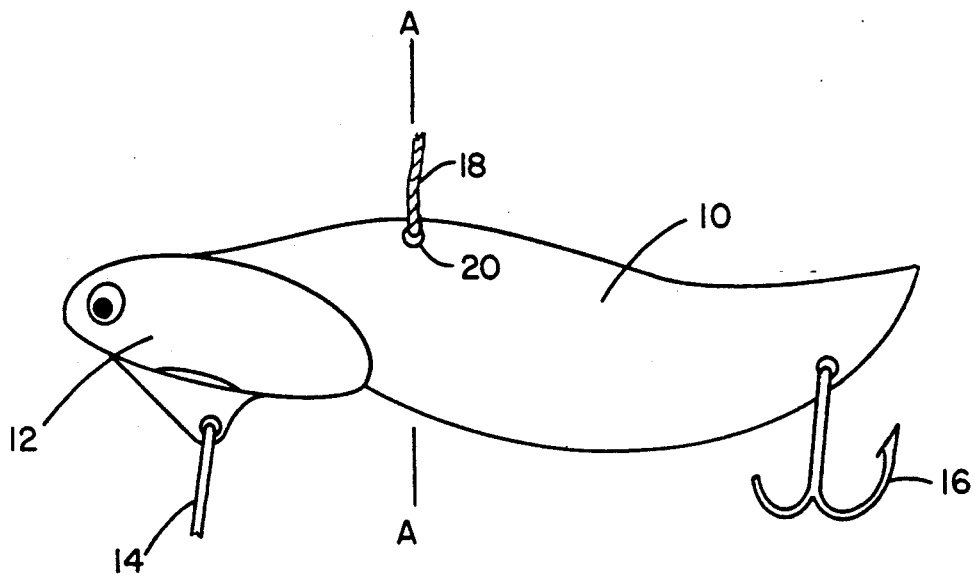

United States Patent [19]
Nuckols

[11] Patent Number: 5,020,265
[45] Date of Patent: Jun. 4, 1991

[54] WEIGHTED FISHING LURE

[76] Inventor: Charles E. Nuckols, P.O. Box 770, Blountville, Tenn. 37617

[21] Appl. No.: 476,526

[22] Filed: Feb. 7, 1990

[51] Int. Cl.$^5$ .............................................. A01K 91/00
[52] U.S. Cl. .................................. 43/42.39; 43/42.45; 43/42
[58] Field of Search ..................... 43/42.39, 42.45, 42, 43/44.89

[56] References Cited
U.S. PATENT DOCUMENTS

| 1,855,097 | 4/1932 | Chamberlaine | 43/42.45 |
| 3,744,175 | 7/1973 | Bellah et al. | 43/42.39 |
| 3,981,096 | 9/1976 | Tolvonen | 43/42.39 |
| 4,885,863 | 12/1989 | Sprague | 43/17.2 |

Primary Examiner—Richard K. Seidel
Assistant Examiner—Patty E. Hong

[57] ABSTRACT

A fishing lure comprised of essentially lead-free, die cast zinc or zinc alloy, which composition provides an overall balance of physical properties allowing particular sinking actions to be designed into the lure to more accurately simulate natural actions of bait fish; the die cast zinc having a density of from about 0.22 to about 0.26 lbs/in$^3$, and having enhanced surface porposity relative to poured zinc.

11 Claims, 1 Drawing Sheet

WEIGHTED FISHING LURE

This invention concerns fishing lures and particularly one which is comprised of essentially lead-free, die cast zinc or zinc alloy, which composition provides an overall balance of physical properties allowing particular sinking actions to be designed into the lure to more accurately simulate natural actions of bait fish.

Heretofore, the preferred materials for the manufacture of fishing lures has been stated in the patent literature to be aluminum, lead, wood, cellulosic, silver, tin, stainless steel and plastic, as described in U.S. Pat. Nos.: 555,012; 1,295,448; 1,723,193; 1,123,951; 2,275,253; 2,480,580; 3,676,948; and 4,437,257.

Such materials as well as the methods of production do not give the best balance of physical properties such as density, impact strength, toughness, high pitched retrieval sound or hook rattle, or the like for sinking lures, particularly as required for the type of sinking action preferred for Applicant's lure, i.e., the slighly fluttering action of a wounded minnow gradually sinking to the lake bottom. Also, lead lures are well recognized by environmentalists as being a poison threat to water fowl as well as fish.

Objects therefore, of the present invention, are: to provide a sinkable essentially lead free fishing lure having a high degree of toughness, ductility, impact strength, retrieval sound and other such physical properties, and particularly of the proper density such that it can be designed to sink at the correct rate and action to simulate a wounded, sinking bait fish; and to provide an efficient and high output process for its manufacture.

These and other objects hereinafter appearing have been attained in accordance with the present invention which is defined in its broad sense as a weighted fishing lure having predesigned sinking characteristics and comprised principally of die cast zinc having a density of from about 0.22 to about 0.26 lbs/in$^3$, and having enhanced surface propropsity relative to poured zinc.

In certain preferred embodiments:

(a) the zinc content is at least about 90 weight percent;

(b) the die cast zinc has a density of about 0.24 lbs/in$^3$ and an enhanced porosity skin of from about 0.010 in. to about 0.040 in thickness.

(c) the lure is in the shape of a minnow wherein a tether eye is provided on its dorsal edge approximately on the center of gravity axis of the lure; and (d) the lure is provided with a permanent surface color wherein the colorant material has penetrated into and is adhered to the enhanced pore sites in the skin of the lure.

Figure 2:
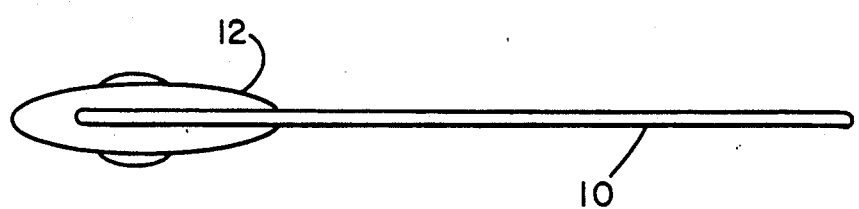

Other objects, advantages and preferred embodiments of the invention will become apparent from the following description and drawing wherein:

FIG. 1 is a side elevational view of a minnow shaped embodiment of the invention; and FIG. 2 is a top elevational view of the lure of FIG. 1.

Referring to the drawings the minnow shaped embodiment of the present invention comprises the elongated body portion 10 and a laterally enlarged forward or head portion 12. This portion 12 shifts the center of gravity of the lure forward to the approximate position of line A—A in FIG. 1. This center of gravity, with the hooks attached such as 14 and 16 as shown, and with a fishing line or connecting device on a line 18 affixed in tether eye 20, allows the lure to sink approximately at the attitude shown such as to simulate a slowly sinking minnow. The type of hooks, e.g., single, double or triple, and either number may be varied as long as the center of gravity position is essentially maintained. Various other fish shapes or other bait shapes, i.e., frogs, may also be employed.

The lure is substantially die cast zinc, for example, cast in a hardened steel split mold of a conventional, multi-cavity die casting machine at a die temperature of from about 325–375 degrees F., the temperature of the zinc melt feed being about 770 to about 790 F. from a gas fired crucible. The cycle time is about 400 cycles per hour, with a dwell time in the mold cavity of about 2.5 sec., the lure cooling to ambient temperature in about two minutes. This processing gives a skin of from about 0.010 to about 0.040 in., preferably from about 0.018 to about 0.027 in. having substantially greater surface porosity than a poured metal item of the same composition. This enhanced porosity is clearly evident when viewed under magnification and greatly improves the permanent adherence thereto of colorant materials such as paints and laquers. This feature is quite important for such lures which can incur rough treatment from fish bites or snagging on rocks or the like. It is noted that trace amount of various metals, including lead, will often appear in the zinc stock, however, such amounts are readily tolerated by the invention.

The density achieved by this die cast process appears to be exactly correct for imparting a realistic sinking minnow action in water to the lure. Other materials and manufacturing processes require density adjustments by means of weight attachments or the like which necessarily alter the appearance and action in water of the lure.

This invention has been described in detail with particular reference to preferred embodiments thereof, but it will be understood that variations and modifications will be effected within the spirit and scope of the invention.

I claim:

1. A weighted fishing lure having predesigned sinking characteristics and comprised principally of die cast zinc having a density of about 0.24 lbs/in$^3$.

2. The lure of claim 1 wherein its zinc content is at least about 90 weight percent.

3. The lure of claim 1 in the shape of a minnow wherein a tether eye is provided on its dorsal edge approximately on the center of gravity axis of the lure.

4. The lure of claim 3 wherein hook means are provided adjacent the head and tail of the lure on the underside thereof.

5. The lure of claim 4 provided with a permanent surface color wherein the colorant material has penetrated into and is adhered to the enhanced pore sites in the skin of the lure.

6. The lure of claim 5 wherein the forward portion thereof is laterally enlarged and shifts forwardly the center of gravity axis of the lure.

7. The lure of claim 6 wherein the lure composition is comprised of at least about 95% by weight zinc and about 3.0% by weight aluminum.

8. The lure of claim 1 wherein the lure composition is comprised of at least about 95% by weight zinc and about 3.0% by weight aluminum.

9. The lure of claim 1 wherein said surface comprises a skin of from about 0.010 to about 0.040 inches in thickness and showing, under magnification, substantial porosity.

10. The lure of claim 1 provided with a permanent surface color wherein the colorant material has penetrated into and is adhered to enhanced pore sites in the skin of the lure.

11. The lure of claim 1 wherein the zinc is cast in a hardened steel split mold of a multi-cavity die casting machine at a die temperature of from about 325–375 degrees F., the temperature of the zinc melt feed being about 770 to about 790 F.

* * * * *